(12) United States Patent
Shi et al.

(10) Patent No.: US 11,281,923 B2
(45) Date of Patent: Mar. 22, 2022

(54) OBJECT RECOGNITION METHOD, APPARATUS AND NETWORK

(71) Applicant: Fujitsu Limited, Kawasaki (JP)

(72) Inventors: Lu Shi, Beijing (CN); Qi Wang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 260 days.

(21) Appl. No.: 16/777,314

(22) Filed: Jan. 30, 2020

(65) Prior Publication Data

US 2020/0265254 A1 Aug. 20, 2020

(30) Foreign Application Priority Data

Feb. 19, 2019 (CN) .......................... 201910121363.3

(51) Int. Cl.
*G06K 9/00* (2006.01)
*G06K 9/46* (2006.01)

(52) U.S. Cl.
CPC ........... *G06K 9/00979* (2013.01); *G06K 9/46* (2013.01)

(58) Field of Classification Search
CPC .. G06K 9/00979; G06K 9/46; G06K 9/00664; G06K 9/6271; G06K 9/6268
USPC ........................................................ 382/103
See application file for complete search history.

(56) References Cited

U.S. PATENT DOCUMENTS

| | | | |
|---|---|---|---|
| 9,760,806 B1 | 9/2017 | Ning et al. | |
| 2018/0211157 A1* | 7/2018 | Liu | .............. G06T 3/4046 |
| 2019/0311249 A1* | 10/2019 | Zhang | .............. G06F 17/15 |

FOREIGN PATENT DOCUMENTS

| | | |
|---|---|---|
| CN | 108229442 A | 6/2018 |
| CN | 108509859 A | 9/2018 |
| CN | 108537117 A | 9/2018 |

OTHER PUBLICATIONS

Xiaowei Xu et al. DAC-SDC Low Power Object Detection Challenge for UAV Applications, Journal of Latex Class Files, vol. 14, No. 8, Aug. 2018.

* cited by examiner

*Primary Examiner* — Stephen P Coleman
(74) *Attorney, Agent, or Firm* — Staas & Halsey LLP

(57) ABSTRACT

Embodiments of this disclosure provide an object recognition method, apparatus and network, in which by replacing a part of convolutional layers in a conventional YOLO network with depth-wise separable convolutional layers, an amount of computation may be reduced; and by replacing residual structures in the conventional YOLO network with dense connection structures, convergence may be sped up, complexity of the network may be lowered, and the original accuracy of object recognition may be maintained.

8 Claims, 6 Drawing Sheets

OBJECT RECOGNITION METHOD, APPARATUS AND NETWORK

CROSS-REFERENCE TO RELATED APPLICATIONS

This application is based on and hereby claims priority to Chinese Application No. 201910121363.3, filed Feb. 19, 2019, in the State Intellectual Property Office of China, the disclosure of which is incorporated herein by reference.

FIELD

This disclosure relates to the field of object recognition technologies, and in particular to an object recognition method, an apparatus thereof and a network.

BACKGROUND

Nowadays, object recognition technique is widely used in many fields, in which You Only Look Once (YOLO) is one of the successful structures with high speed and high recognition accuracy. This kind of network is a single-step recognition network, in which a location function and a detection function are integrated. Similar to the structure of feature pyramid networks (FPNs), with the help of GTX1080Ti GPU, it may achieve 30 fps (YOLO V3 416) and accuracy similar to that of a faster region-convolutional neural network (R-CNN).

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

According to an embodiment of this disclosure, there is provided an object recognition network. The object recognition network includes: multiple first convolutional layer groups connected to each other to extract features of an input image, at least three first convolutional layer groups among the multiple first convolutional layer groups being respectively connected to a second convolutional layer group among second convolutional layer groups, each of the multiple first convolutional layer group including multiple first convolutional layers, multiple first convolutional layers included in at least one first convolutional layer group being connected by dense connection structures, and one of first convolutional layers among the multiple first convolutional layers connected by the dense connection structures using depth-wise separable convolution.

The object recognition network includes multiple second convolutional layers, each second convolutional layer being located between two first convolutional layer groups among the first convolutional layer groups or being located before a first one of the first convolutional layer groups; and three second convolutional layer groups among the second convolutional layer groups being connected to each other.

According to the object recognition network, a first one of the three second convolutional layer groups is connected to a last first convolutional layer group and output thereof is taken as input of a processor, a sum of output of a second one of the three second convolutional layer groups and output of one first convolutional layer group is taken as input of the processor, a sum of output of a third one of the three second convolutional layer groups and output of one first convolutional layer group is taken as input of the processor, and each of the second convolutional layer groups comprises multiple third convolutional layers.

According to an embodiment of this disclosure, there is provided an object recognition method, wherein the object recognition method includes: features of an input image are extracted by using the object recognition network as described in the first aspect; and object recognition is performed according to the extracted features.

According to an embodiment of this disclosure, there is provided an object recognition apparatus. The object recognition apparatus includes: a memory, and a processor coupled to the memory. The processor is configured to extract features of an input image by using the object recognition network as described herein; and perform object recognition according to the features extracted.

According to an embodiment of this disclosure, there is provided a computer readable program, which, when executed in an object recognition apparatus or an image processing device, will cause the object recognition apparatus or the image processing device to carry out the object recognition method as described in herein.

According to an embodiment of this disclosure, there is provided a computer readable medium, including a computer readable program, which will cause an object recognition apparatus or an image processing device to carry out the object recognition method as described herein.

By way of example, one advantage of the embodiments of this disclosure exists in that by replacing a part of convolutional layers in a conventional YOLO network with depth-wise separable convolutional layers, an amount of computation may be reduced; and by replacing residual structures in the conventional YOLO network with dense connection structures, convergence may be sped up, complexity of the network may be lowered, and the original accuracy of object recognition may be maintained.

With reference to the following description and drawings, the particular embodiments of this disclosure are disclosed in detail, and the principles of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

The drawings are included to provide further understanding of this disclosure, which constitute a part of the specification and illustrate the preferred embodiments of this disclosure, and are used for setting forth the principles of this disclosure together with the description. It is clear and understood that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

Various implementations of the embodiments of this disclosure shall be described below with reference to the accompanying drawings. These implementations are illustrative only, and are not intended to limit this disclosure.

It was found by the inventors that for many projects, such a speed is far from sufficient. The original intention of YOLO was to handle thousands of classification tasks. In YOLO V3, a complex backbone network Darknet-53 is used. In most applications, the structure of this backbone network is not sufficiently concise, and complex networks represent slow speed and high memory footprint. On the other hand, pre-trained models are always based on a public dataset. If a recognition goal is far different from the objects in the public dataset, the pre-trained model will be useless. In fact, it is the case in most times. When the dataset is relatively small, a network capable of quickly converging small sample data is needed.

In order to solve at least one of the above problems, embodiments of this disclosure provide an object recognition method, an apparatus thereof and a network, so as to reduce an amount of computation, speed up convergence, lower complexity of the network, and maintain the original accuracy of object recognition.

Embodiment 1

Figure 1:
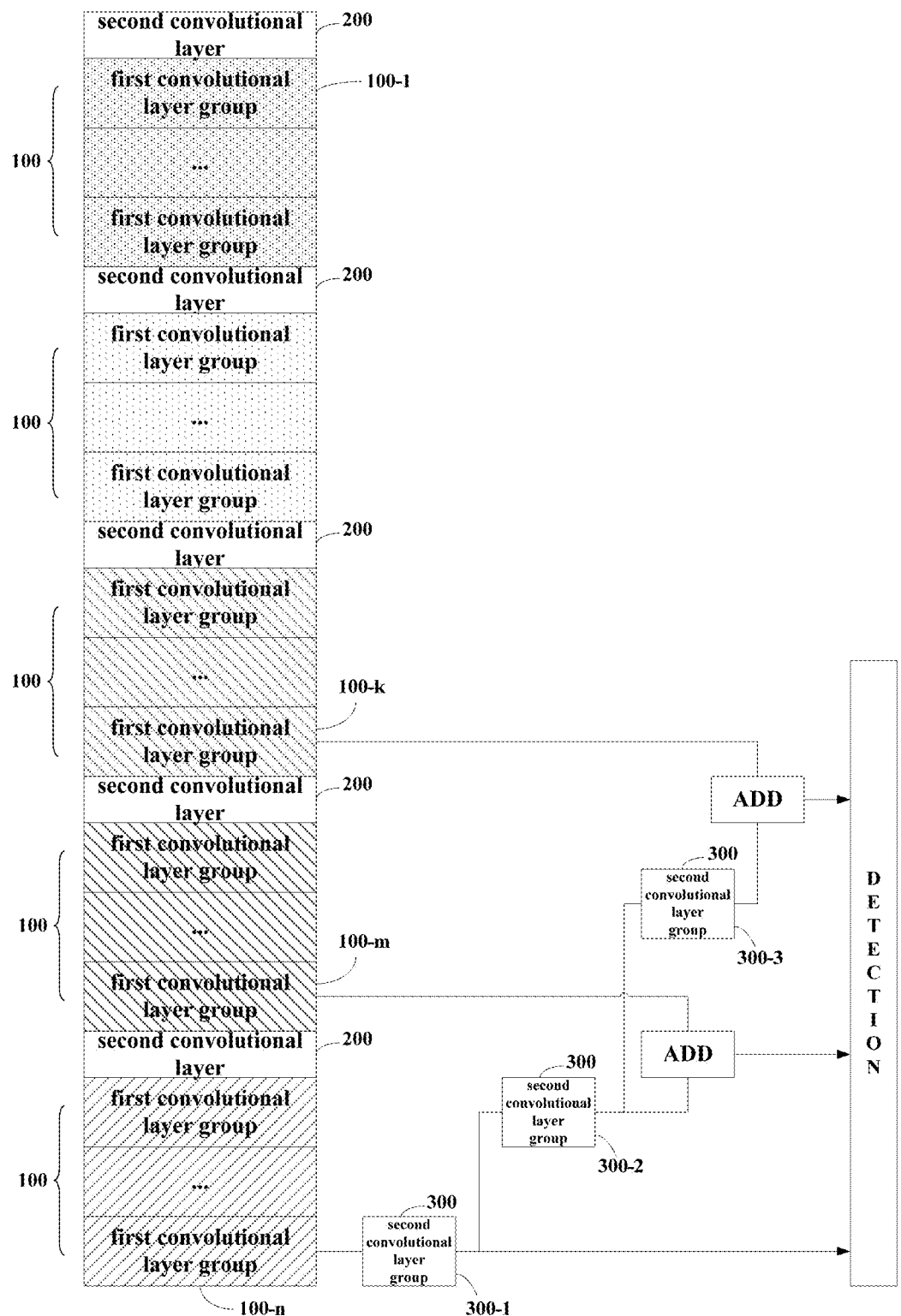
FIG. 1 is a schematic diagram of the object recognition network according to an embodiment.

This embodiment provides an object recognition network. FIG. 1 is a schematic diagram of the object recognition network according to an embodiment. As shown in FIG. 1, the object recognition network includes: multiple first convolutional layer groups 100, multiple second convolutional layers 200 and three second convolutional layer groups 300. In this embodiment, the first convolutional layer groups 100 and the second convolutional layers 200 may also be referred to as "a feature extraction network", the second convolutional layer groups 300 may also be referred to as "a classification regression network", outputs of the second convolutional layer groups 300 are taken as input of a detecting module (processor), and the detecting module performs object recognition according to the outputs of the second convolutional layer groups 300. Definitions of the feature extraction network and the classification regression network are identical to those in the related art, and shall not be described herein any further.

In this embodiment, as shown in FIG. 1, the multiple first convolutional layer groups 100 are connected to each other to extract features of an input image, and at least three of the multiple first convolutional layer groups 100 are connected to the second convolutional layer groups 300, each first convolutional layer group 100 including multiple convolutional layers (referred to as first convolutional layers); wherein multiple first convolutional layers included in at least one first convolutional layer group 100 are connected by dense connection structures, at least one of the multiple first convolutional layers connected by the dense connection structures using depth-wise separable convolution. By connecting the convolutional layers in the first convolutional layer groups 100 using the dense connection structures, convergence may be sped up, complexity of the network may be lowered, and the original accuracy of object recognition may be maintained. And furthermore, by replacing a part of convolutional layers in a conventional YOLO network with the depth-wise separable convolutional layers, an amount of computation may be reduced.

In this embodiment, the number of convolution layers included in each first convolution layer group 100 may be two or three, or other numbers, and at least one first convolution layer included in the first convolution layer groups 100 not connected to the second convolution layer groups 300 may also use depth-wise separable convolution, which may also reduce the amount of computation. In addition, the multiple first convolutional layers included in the first convolutional layer groups 100 not connected to the second convolutional layer groups 300 may be connected by the dense connection structures, or may be connected by residual structures, or may be connected by other existing means. By using the dense connection structures in connection, it may also speed up the convergence, reduce network complexity, and maintain the original object recognition accuracy; and by using the residual structures in connection, a convergence effect may be ensured, and accuracy of the object recognition may be improved as a whole.

In this embodiment, the multiple first convolutional layers included in each first convolutional layer group 100 (the at least three first convolutional layer groups 100 described above) connected to the second convolutional layer groups 300 may be connected by the dense connection structures to achieve the above effects.

In this embodiment, as shown in FIG. 1, the multiple second convolutional layers 200 are respectively located between two first convolutional layer groups 100, or may be located before a first one of the first convolutional layer groups 100, and may be pooling layers, or may be convolutional layers of a stride of 2. Reference may be made to the related art for definitions and implementations of the pooling layers and the convolutional layers of a stride of 2, which shall not be described herein any further. Moreover, the second convolutional layers 200 may also be implemented by using an Atrous algorithm, and reference may be made to the related art for its particular implementation, which shall not be described herein any further.

In this embodiment, the first one of the first convolutional layer groups 100 refers a first convolutional layer group 100 having a shallowest depth in the first convolutional layer groups 100, such as the first convolutional layer group 100-1 shown in FIG. 1. In addition, in this embodiment, a last one of the first convolutional layer groups 100 is a first convolutional layer group 100 having a deepest depth in the first convolutional layer groups 100, such as the first convolutional layer group 100-$n$ shown in FIG. 1.

In this embodiment, as shown in FIG. 1, the above three second convolutional layer groups 300 are connected to each other, and the outputs thereof are taken as input of the detecting module. For example, a first second convolutional layer group 300-1 is connected to a last first convolutional layer group 100-$n$ and its output is taken as input of the detecting module, a sum of output of a second one 300-2 of the second convolutional layer groups 300 and output of one first convolutional layer group 100-$m$ is taken as input of the detecting module, a sum of output of a third one 300-3 of the second convolutional layer groups 300 and output of one first convolutional layer group 100-$k$ is taken as input of the detecting module.

In this embodiment, each of the second convolutional layer groups 300 may include multiple third convolutional layers, such as six third convolutional layers; however, this embodiment is not limited thereto.

In this embodiment, the multiple third convolution layers included in the second convolutional layer groups 300 may also be connected by using dense connection structures, and at least one of the multiple third convolution layers included therein may use the depth-wise separable convolution to achieve the above effect.

In the object recognition network of this embodiment, by replacing a part of convolutional layers in a conventional YOLO network with depth-wise separable convolutional layers, an amount of computation may be reduced; and by replacing residual structures in the conventional YOLO network with dense connection structures, convergence may be sped up, complexity of the network may be lowered, and the original accuracy of object recognition may be maintained.

In order to make the advantage of the embodiments of this disclosure more easy to be understood, the separable convolution and the dense connection structures shall be described below in brief.

Figure 2:
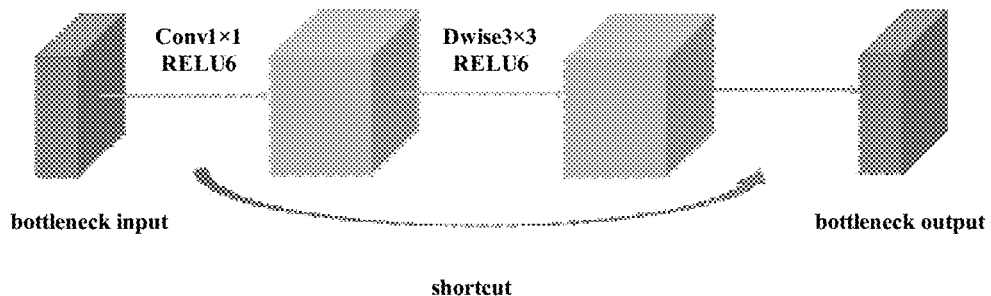
FIG. 2 is a schematic diagram of taking a ground truth and a buffer zone as a dataset.

FIG. 2 is a schematic diagram of the depth-wise separable convolution, showing architecture-optimized depth-wise separable convolution used in a Mobilenet V2 network, which uses a ground truth and a buffer zone as a dataset, which is a core step of simplifying the network.

Compared with conventional convolutional structures, depth-wise separable convolution may achieve spatial convolution by connecting deep convolutional structures while maintaining channel separation. For example, suppose there exists a convolutional layer of a size 3*3, a conventional convolution structure has 16 input channels and 32 output channels, which creates 16*32=512 pieces of feature mapping and 4608 parameters. For a lightweight convolution structure, depth-wise separable convolution traverses feature mapping of a convolution kernel with a size of 1*1 before a fusion operation. This process uses 16*3*3+16*32*1*1=656 parameters, which are much lower than the 4608 parameters of the above conventional convolution structure. Thus, use of the depth-wise separable convolution may reduce an amount of computation.

Figure 3:
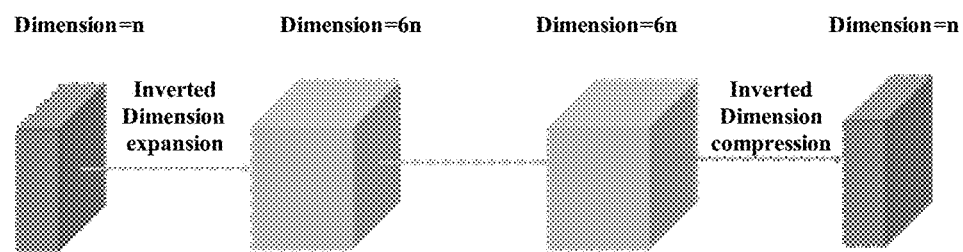
FIG. 3 is a schematic diagram of an inverse block (inverted block)

FIG. 3 is a schematic diagram of an inverse residual structure. Unlike the depth-wise separable convolution, the inverse residual structure is added with a residual block and an extended convolution structure. The residual block may deepen the network, and the expanded convolution structure may increase the number of important features. Such a network may extract object features more efficiently. FIG. 3 illustrates a process of expanding dimensions by 6 times and compressing the dimensions.

Figure 4:
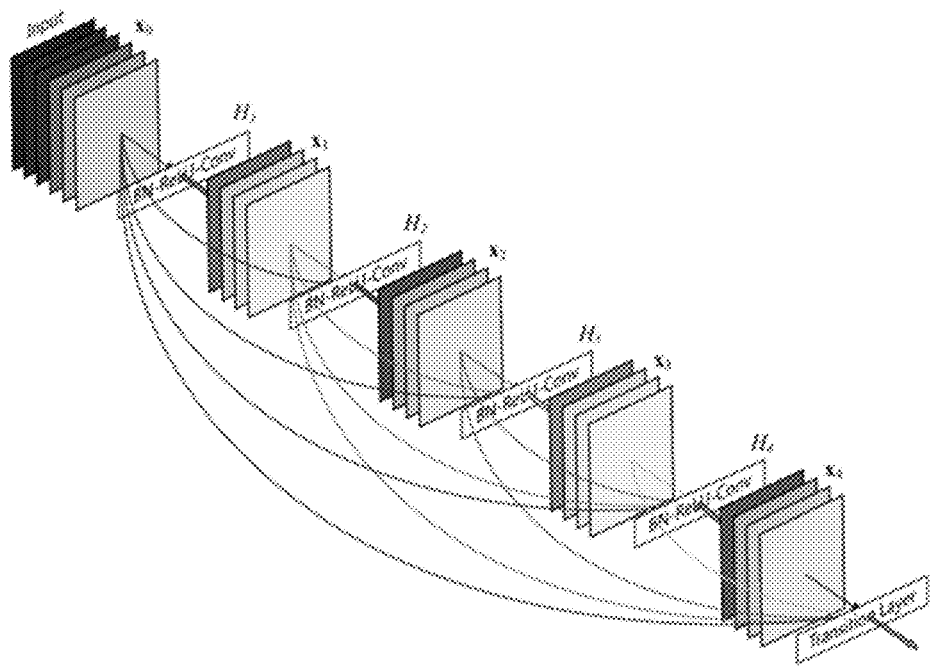
FIG. 4 is a schematic diagram of a dense connection structure.

FIG. 4 is a schematic diagram of a dense connection structure. In this dense connection structure, feature layers having identical sizes may be connected. In other words, feature layers of identical sizes may be deemed as an integer. For example, layers between two parts of a convolutional layer with a step size of 2 are densely connected. Compared with the residual structure, this structure may provide more effective paths for back propagation. Hence, gradient descent information may be easily transferred to a shallow layer.

In this embodiment, the number of the first convolutional layer groups 100 is not limited, and positions of the second convolutional layers 200 are not limited, as long as they are located between two first convolutional layer groups 100 or before the first one of the first convolutional layer groups 100. In addition, in this embodiment, the number of the second convolutional layer groups 300 is also not limited, which may be three or other numbers.

Figure 5:
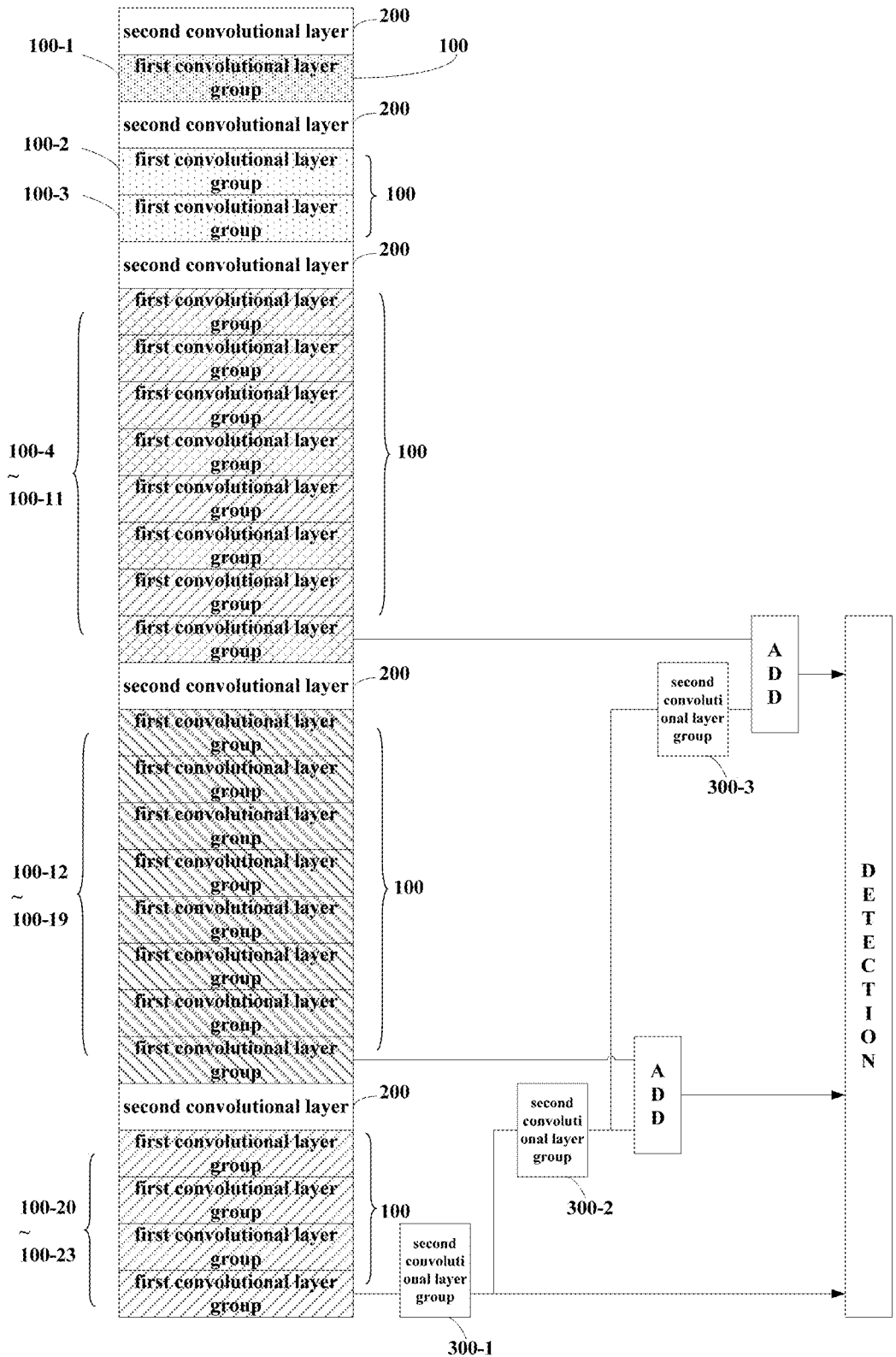
FIG. 5 is another schematic diagram of the object recognition network according to an embodiment.

FIG. 5 is another schematic diagram of the object recognition network of this embodiment. As shown in FIG. 5, in this object recognition network, the number of the first convolutional layer groups 100 is 23, which are expressed as 100-1 to 100-23; the number of the second convolutional layers 200 is 5, which are expressed as 200-1 to 200-5; and the number of the second convolutional layer groups 300 is 3, which are expressed as 300-1 to 300-3. And in the example of FIG. 5, structures of the first convolutional layer groups 100-2 to 100-3 are identical, structures of the first convolutional layer groups 100-4 to 100-11 are identical, structures of 100-12~100-19 are identical, structures of the first convolutional layer group 100-20~100-23 are identical. Here, the structures being identical refers to that coefficients (such as the number of filters, sizes and output etc.) of the included multiple first convolution layers are identical.

Figure 6:
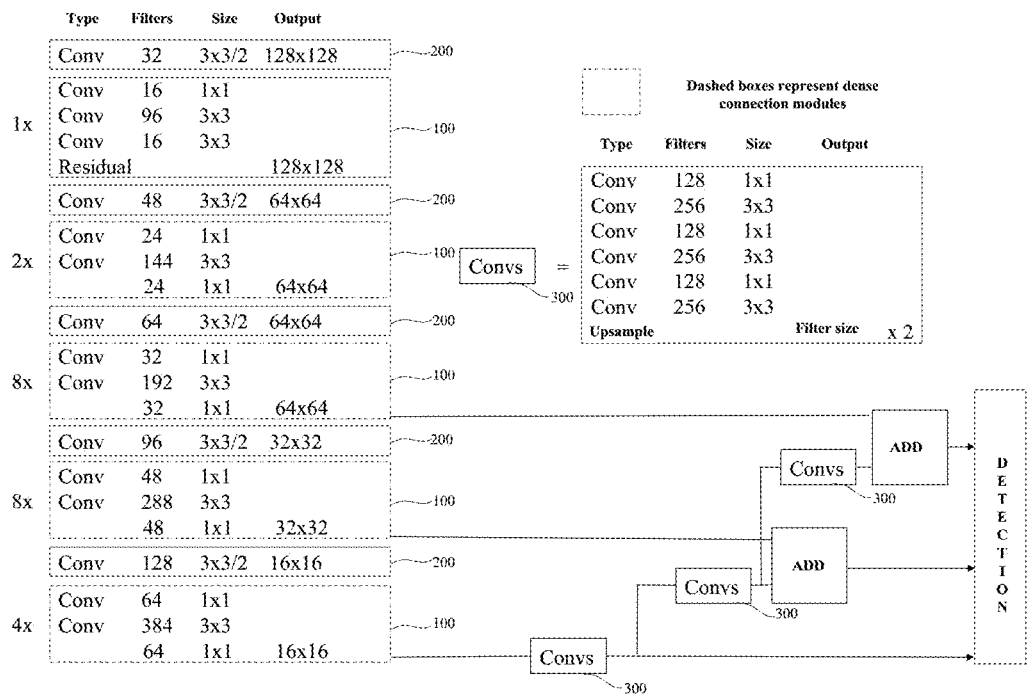
FIG. 6 is a schematic diagram of one particular implementation of the object recognition network shown in FIG. 5.

FIG. 6 is a schematic diagram of one particular implementation of the object recognition network shown in FIG. 5. As shown in FIG. 6, in this object recognition network, structures of the first convolution layer groups 100, coefficients of the first convolutional layers included in the first convolution layer groups 100, coefficients of the second convolutional layers 200, structures of the second convolutional layer groups 300 and coefficients of the third convolutional layers included in the second convolutional layer groups 300 are shown. The example in FIG. 6 is illustrative only, and according to the particular implementation, the first convolutional layer groups 100 may include more or less first convolutional layers, the second convolutional layer groups 300 may also include more or less third convolutional layers, and coefficients of the convolutional layers may also be other values.

In the above embodiments, description is given by taking that the first convolutional layer groups 100 include two or three first convolutional layers and the second convolutional layer groups 300 include six third convolutional layers as an example. However, this embodiment is not limited thereto, and the number of the first convolutional layers included in the first convolutional layer groups 100 and the number of the third convolutional layers included in the second convolutional layer groups 300 may be other numbers, dependent on particular implementations.

By using the object recognition network of this embodiment, the amount of computation is reduced, convergence is sped up, complexity of the network is reduced, and the original object recognition accuracy is maintained.

Table 1 shows experimental results of the object recognition network of this embodiment using the inverse residual structure and the inverse residual structures+dense connection structures in comparison with the existing YOLO Darknet network. In this experiment, sizes of the input image are 416×416, and an amount of computation is shown in Table 1.

TABLE 1

|  | Amount of computation (GFI ops) | Size of model (Mb) | Theoretical speed (FPS) |
|---|---|---|---|
| YOLO Darknet | 65.8 | 246 | 24 |
| Inverse residual structure | 15 | 35 | 102 |
| Inverse residual structures + dense connection structures | 16.9 | 37 | 100 |

It can be seen from table 1 that use of the inverse residual structures+dense connection structures may efficiently lower the complexity of the network.

Table 2 shows experimental results of the object recognition network of this embodiment using the inverse residual structure and the inverse residual structures+dense connection structures in comparison with the existing YOLO Darknet network using a pre-trained model. It can be seen from the experimental results in Table 2 that for a training condition of a small training dataset with no pre-trained model, dense blocks (dense connection structures) play an important role.

TABLE 2

|  | Convergence speed (batches 1/0.5) | 50000 batches losses (average) | Testing mAP (50000 batches) |
|---|---|---|---|
| YOLO Darknet with a pre-trained model | 2800/39500 | 0.435 | 0.79 |
| Inverse residual structures | 5600/43200 | 0.464 | 0.76 |
| Inverse residual structures + dense connection structures | 5200/41700 | 0.458 | 0.77 |

Figure 7:
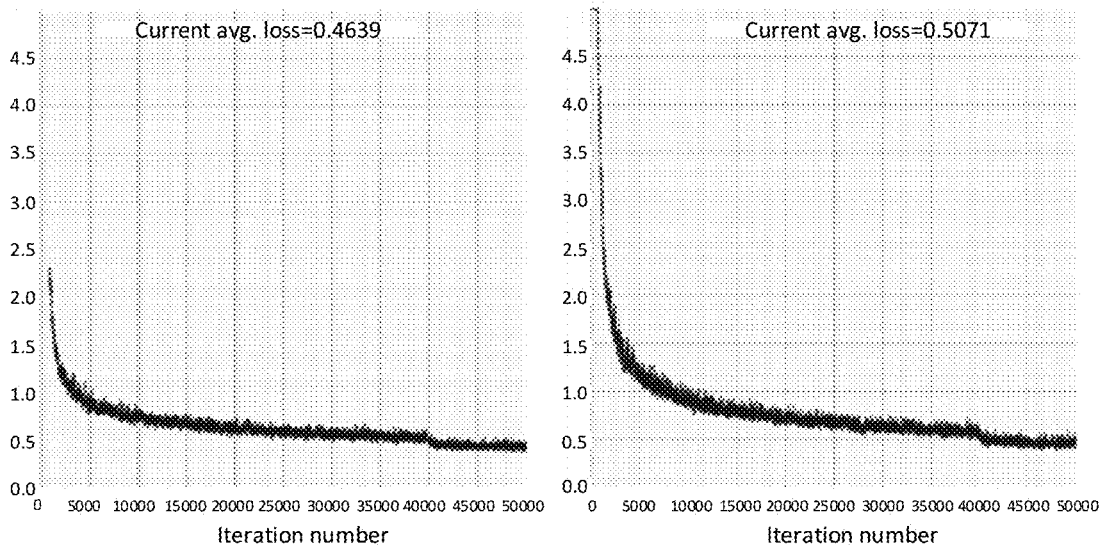
FIG. 7 is a schematic diagram of training losses.

FIG. 7 is a schematic diagram of training losses, showing training losses of the YOLO Darknet network (left side) with a pre-trained model and the object recognition network (right side) using the dense connection structures of this embodiment. In FIG. 7, the abscissa denotes training batches, and the ordinate denotes loss values. As can be seen from FIG. 7, compared with the original structures, the object recognition network with reverse dense blocks in this embodiment may increase a speed by four times and maintain its original accuracy. At the same time, a model convergence speed may also be maintained without a pre-trained model. And furthermore, the inverse dense convolutional block are adjustable in both the backbone network and the regression network.

In the object recognition network of this embodiment, three different first convolutional layer groups 100 are respectively regressed to objects of different sizes. The number of these layers may be adjusted for different application conditions. For example, if it is expected to obtain higher accuracy of small objects, the number of inverse dense blocks in the shallow layer part may be increased. Here, the inverse dense blocks are the convolutional layer groups using the dense connection structures.

Figure 8:
FIG. 8 is a schematic diagram of object recognition results of the object recognition network of this embodiment and an existing YOLO Darknet network.

FIG. 8 is a schematic diagram of object recognition results of the object recognition network of this embodiment and an existing YOLO Darknet, in which the left side is a recognition result of the existing YOLO Darknet network, and the right side is a recognition result of the object recognition network using the dense connection structures of this embodiment. It can be seen from FIG. 8 that the object recognition network in this embodiment reduces an amount of computation, speeds up the convergence, lowers the complexity of the network, and maintains the original object recognition accuracy.

Embodiment 2

Figure 9:
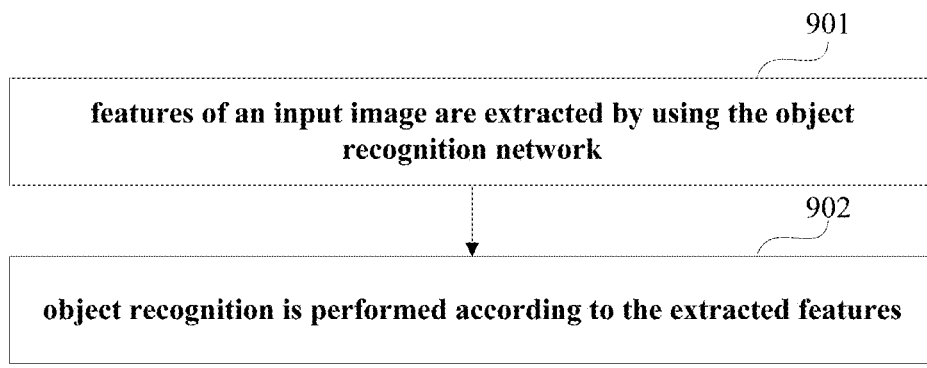
FIG. 9 is a schematic diagram of the object recognition method according to an embodiment.

This embodiment provides an object recognition method. FIG. 9 is a schematic diagram of the object recognition method of this embodiment. As shown in FIG. 9, the method includes:

operation 901: features of an input image are extracted by using the object recognition network as described in Embodiment 1; and operation 902: object recognition is performed according to the extracted features. In this embodiment, as the features of the input image are extracted by using the object recognition network as described in Embodiment 1, an amount of computation may be reduced, convergence may be sped up, complexity of the network may be lowered, and the original accuracy of object recognition may be maintained.

In this embodiment, reference may be made to the related art for a particular implementation of the feature extraction and a particular implementation of the object recognition, which shall not be described herein any further.

Embodiment 3

This embodiment provides an object recognition apparatus. As principles of the apparatus for solving problems are similar to that of the method in Embodiment 2, reference may be made to the implementation of the method in Embodiment 2 for implementation of the apparatus, with identical contents being not going to be described herein any further.

Figure 10:
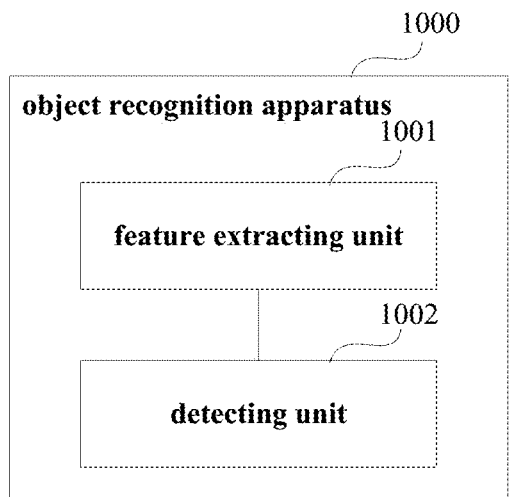
FIG. 10 is a schematic diagram of the object recognition apparatus according to an embodiment.

FIG. 10 is a schematic diagram of the object recognition apparatus 1000 of this embodiment. As shown in FIG. 10, the object recognition apparatus 1000 includes a feature extracting unit 1001 and a detecting unit 1002, wherein the feature extracting unit 1001 is configured to extract features of an input image by using the object recognition network as described in Embodiment 1, and the detecting unit 1002 is configured to perform object recognition according to the features extracted by the feature extracting unit 1001.

In this embodiment, as the features of the input image are extracted by using the object recognition network as described in Embodiment 1, an amount of computation may be reduced, convergence may be sped up, complexity of the network may be lowered, and the original accuracy of object recognition may be maintained.

Embodiment 4

This embodiment provides an image processing device, including the object recognition apparatus as described in Embodiment 3.

Figure 11:
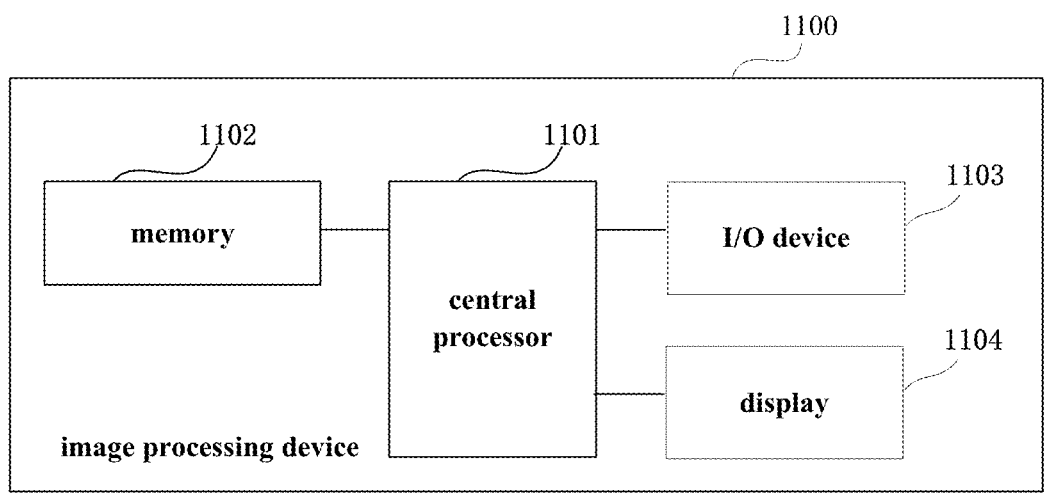
FIG. 11 is a schematic diagram of the image processing device according to an embodiment.

FIG. 11 is a schematic diagram of the image processing device 1100 of this embodiment. As shown in FIG. 11, the image processing device 1100 may include a central processor 1101 (CPU) and a memory 1102, the memory 1102 being coupled to the central processor 1101. The memory 1102 may store various data, and furthermore, it may store a program for data processing, and execute the program under control of the central processor 1101.

In one implementation, the functions of the object recognition apparatus 1000 may be integrated into the central processor 1101, wherein the central processor 1101 may be configured to carry out the object recognition method described in Embodiment 2.

In another implementation, the object recognition apparatus 1000 and the central processor 1101 may be configured separately; for example, the object recognition apparatus 1000 may be configured as a chip connected to the central processor 1101, and the functions of the object recognition apparatus 1000 are executed under control of the central processor 1101.

Furthermore, as shown in FIG. 11, the image processing device 1100 may include an input/out (I/O) device 1103, and a display 1104, etc.; wherein functions of the above components are similar to those in the related art, which shall not be described herein any further. It should be noted that the image processing device 1100 does not necessarily include all the parts shown in FIG. 11, and furthermore, the image processing device 1100 may include parts not shown in FIG. 11, and the related art may be referred to.

An embodiment of this disclosure provides a computer readable program, which, when executed in an object recognition apparatus or an image processing device, will cause the object recognition apparatus or the image processing device to carry out the method described in Embodiment 2.

An embodiment of the present disclosure provides a computer readable medium, including a computer readable program, which will cause an object recognition apparatus or an image processing device to carry out the method described in Embodiment 2.

The above apparatuses and methods of this disclosure may be implemented by hardware, software, or by hardware in combination with software. This disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in FIG. 10 may either correspond to software modules of procedures of a computer program, or correspond to hardware modules. Such software modules may respectively correspond to the steps shown in FIG. 9. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the figures may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principles of the present disclosure, and such variants and modifications fall within the scope of the present disclosure.

What is claimed is:

1. An object recognition network, comprising:
   multiple first convolutional layer groups connected to each other to extract features of an input image, at least three first convolutional layer groups among the multiple first convolutional layer groups being respectively connected to a second convolutional layer group among second convolutional layer groups,
   each of the multiple first convolutional layer groups including multiple first convolutional layers, multiple first convolutional layers included in at least one first convolutional layer group being connected by dense connection structures, and one of first convolutional layers among the multiple first convolutional layers connected by the dense connection structures using depth-wise separable convolution;
   multiple second convolutional layers, each second convolutional layer being located between two first convolutional layer groups among the first convolutional layer groups or being located before a first one of the first convolutional layer groups; and
   three second convolutional layer groups among the second convolutional layer groups being connected to each other;
   wherein, a first one of the three second convolutional layer groups is connected to a last first convolutional layer group and output thereof is taken as input of a processor, a sum of output of a second one of the three second convolutional layer groups and output of one first convolutional layer group is taken as input of the processor, a sum of output of a third one of the three second convolutional layer groups and output of one first convolutional layer group is taken as input of the processor, and each of the second convolutional layer groups includes multiple third convolutional layers.

2. The object recognition network according to claim 1, wherein the second convolutional layers are pooling layers, or convolutional layers of a stride of 2.

3. The object recognition network according to claim 1, wherein the second convolutional layers use an Atrous algorithm.

4. The object recognition network according to claim 1, wherein multiple first convolutional layers contained in each of the at least three of the multiple first convolutional layer groups are connected by dense connection structures.

5. The object recognition network according to claim 1, wherein multiple first convolutional layers contained in at least one first convolutional layer group are connected by residual structures.

6. The object recognition network according to claim 1, wherein multiple third convolutional layers in each of the second convolutional layer groups are connected by dense connection structures.

7. An object recognition apparatus, comprising:
   a memory; and
   a processor coupled to the memory and configured to:
   extract features of an input image by using an object recognition network; and
   perform object recognition according to the features extracted,
   wherein, the object recognition network comprises:
   multiple first convolutional layer groups connected to each other to extract features of an input image, at least three first convolutional layer groups among the multiple first convolutional layer groups being respectively connected to a second convolutional layer group among second convolutional layer groups,
   each of the multiple first convolutional layer group including multiple first convolutional layers, multiple first convolutional layers included in at least one first convolutional layer group being connected by dense connection structures, and one of first convolutional layers among the multiple first convolutional layers connected by the dense connection structures using depth-wise separable convolution;
   multiple second convolutional layers, each second convolutional layer being located between two first convolutional layer groups among the first convolutional layer groups or being located before a first one of the first convolutional layer groups; and
   three second convolutional layer groups among the second convolutional layer groups being connected to each other;
   wherein, a first one of the three second convolutional layer groups is connected to a last first convolutional layer group and output thereof is taken as input of a processor, a sum of output of a second one of the three second convolutional layer groups and output of one first convolutional layer group is taken as input of the processor, a sum of output of a third one of the three second convolutional layer groups and output of one first convolutional layer group is taken as input of the processor, and each of the second convolutional layer groups includes multiple third convolutional layers.

8. An object recognition method, comprising:
   extracting features of an input image by using an object recognition network; and
   performing object recognition according to the extracted features,
   the object recognition network includes:
   multiple first convolutional layer groups connected to each other to extract features of an input image, and at least three first convolutional layer groups among the multiple first convolutional layer groups being respectively connected to a second convolutional layer group among second convolutional layer groups,
   each first convolutional layer group including multiple first convolutional layers, multiple first convolutional layers included in at least one first convolutional layer group being connected by dense connection structures, and one of first convolutional layers among the multiple first convolutional layers connected by the dense connection structures using depth-wise separable convolution;
   multiple second convolutional layers, each second convolutional layer being located between two first convolutional layer groups among the first convolutional layer groups or being located before a first one of the first convolutional layer groups; and
   three second convolutional layer groups among the second convolutional layer groups being connected to each other;

wherein, a first one of the three second convolutional layer groups is connected to a last first convolutional layer group and output thereof is taken as input of a processor, a sum of output of a second one of the three second convolutional layer groups and output of one first convolutional layer group is taken as input of the processor, a sum of output of a third one of the three second convolutional layer groups and output of one first convolutional layer group is taken as input of the processor, and each of the second convolutional layer groups includes multiple third convolutional layers.

\* \* \* \* \*